United States Patent
Jin

(10) Patent No.: US 7,668,555 B2
(45) Date of Patent: Feb. 23, 2010

(54) METHOD FOR COMPUTING BEAMFORMING WEIGHTING VECTORS WITH COLLABORATED UPLINK SOUNDING

(75) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/777,923

(22) Filed: Jul. 13, 2007

(65) Prior Publication Data
US 2008/0051145 A1  Feb. 28, 2008

Related U.S. Application Data

(60) Provisional application No. 60/839,953, filed on Aug. 23, 2006.

(51) Int. Cl.
*H04Q 7/20* (2006.01)
(52) U.S. Cl. .................................. 455/456.2; 455/456.6
(58) Field of Classification Search .............. 455/562.1, 455/63.2, 63.4, 67.13, 456.2, 45.6
See application file for complete search history.

(56) References Cited

U.S. PATENT DOCUMENTS

| | | | |
|---|---|---|---|
| 6,400,780 B1 * | 6/2002 | Rashid-Farrokhi et al. | 375/347 |
| 2006/0285504 A1 * | 12/2006 | Dong et al. | 370/254 |

\* cited by examiner

*Primary Examiner*—Patrick N. Edouard
*Assistant Examiner*—Eric Elcenko

(57) ABSTRACT

A method and system are provided for computing beamforming weighting vectors with collaborated uplink sounding in a wireless communications network. The method comprises selecting a designated uplink sounding region and a signal sequence from a set of orthogonal signal sequences; exchanging collaborated uplink sounding information between a base transceiver station (BTS) in a cell and one or more BTSs in its neighboring cells; receiving one or more first sounding signals in the designated uplink sounding region from a first CPE in the cell, which are considered as desired signals; confirming channel-sharing among the first CPE and one or more second CPEs in the neighboring cells; detecting one or more second sounding signals from the one or more second CPEs, which are considered as interference signals; and calculating the beamforming weighting vector using the first one or more sounding signals and the one or more second sounding signals.

24 Claims, 5 Drawing Sheets

METHOD FOR COMPUTING BEAMFORMING WEIGHTING VECTORS WITH COLLABORATED UPLINK SOUNDING

CROSS REFERENCE

The present application claims the benefit of U.S. Provisional Application Ser. 60/839,953, which was filed on Aug. 23, 2006.

BACKGROUND

One of the factors that limit the capacity of a cellular network is the amount of interference, both inter-cell and intra-cell, that a wireless communications network can tolerate. There are two ways to keep interference below a tolerable level. One is to have a frequency re-use plan that maintains a minimum distance between co-channel cells, and the other is to underutilize the wireless spectrum. However, both methods reduce the usage efficiency of the radio spectrum.

Because the demand for wireless communications has grown dramatically over the years, the radio spectrum has become crowded. It is absolutely essential for a wireless communications network to deploy some type of interference mitigation or suppression method to increase the reuse rate of a radio frequency so that the available radio frequencies can be fully utilized.

A base transceiver station (BTS) equipped with an antenna array system provides an effective means of mitigating or suppressing interference. By applying a beamforming method to an antenna array, the antenna beam pattern is positioned toward the desired signal. In an uplink direction, the beamformed receiving antenna beam pattern points to the desired signal while the null of the antenna beam pattern is positioned towards the interference. In the downlink direction, the beamformed transmitting antenna beam pattern points to the intended receiver while the null of the antenna beam pattern is positioned towards other users. By employing the null-steering beamforming method on both the uplink and downlink directions, the interference in the wireless communications network is effectively suppressed.

In a null-steering beamforming method, the calculation of a beamforming weighting vector takes into account the spatial signatures of both the desired and interference signals. For example, the beamforming weighting vector is obtained by solving the following eigenvalue problem: $(R_i + \sigma_n^2 I)^{-1} R_s \cdot w = \lambda w$, where $R_i$ is the covariance matrix of interference; $\sigma$ is the standard deviation of background noise; $R_s$ is the covariance matrix of the desired signal; and I is the identity matrix. The beamforming weighting vector is the primary eigenvector corresponding to the largest eigenvalue of the eigenvalue problem.

The accuracy of the spatial signatures of the desired signal and the interference signal is an essential factor for finding an optimal beamforming weighting vector in a null-steering beamforming method. The spatial signature of the desired signal of customer premises equipment (CPE) can be obtained from data traffic and designated uplink sounding signals between the BTS and the CPE.

Uplink sounding is a mechanism designed to facilitate the determination of the spatial signature of a communication channel between the BTS and the CPE. The BTS selects a special region in an uplink frame for a CPE to transmit sounding signals. The BTS calculates the spatial signature of the CPE using the detected sounding signals. The spatial signature is subsequently used to calculate the beamforming weighting vector of the CPE.

A sounding signal is transmitted at a frequency that is as close to the frequency for sending data traffic as possible, if not the same, in order to minimize the loss of accuracy due to the frequency mismatch. In one form, the BTS selects a region in the beginning of the uplink frame for sending uplink sounding signals. The BTS instructs the CPE to send uplink sounding signals within the designated sounding region.

Similarly, the BTS allocates a region at the end of the uplink frame for sending downlink sounding signals. The BTS instructs the CPE to send downlink sounding signals within the specified sounding region. The uplink and downlink sounding regions can be merged into one. The sounding signals transmitted in the combined region are used to calculate both the uplink and downlink beamforming weighting vectors of the CPE.

The spatial signature of a communications channel between the BTS and the CPE can be calculated from the sounding signals sent in the designated sounding region. However, there is no easy way to obtain the spatial signature of the interference because it is rather difficult to separate the interference from background noise. In addition, the interference from neighboring cells is not synchronized in time or frequency with the desired signals.

As such, what is desired is a method and system for detecting desired signals as well as the interference signals, thereby achieving effective null-steering beamforming.

SUMMARY

A method is provided for computing a beamforming weighting vector with collaborated uplink sounding in a wireless communications network. The method comprises selecting a region in a frame as a designated uplink sounding region and a signal sequence from a set of orthogonal signal sequences; exchanging collaborated uplink sounding information between a base transceiver station (BTS) in a cell and one or more BTSs in its neighboring cells; receiving one or more first sounding signals in the designated uplink sounding region from a first CPE in the cell, which are considered as desired signals; confirming that the first CPE and one or more second CPEs share a channel; detecting one or more second sounding signals from the one or more second CPEs in the neighboring cells that share the channel with the first CPE, which are considered as interference signals; and calculating the beamforming weighting vector using the first one or more sounding signals and the one or more second sounding signals.

DESCRIPTION

The following detailed description refers to the accompanying drawings.

A method and system are provided for deriving uplink sounding signals. By generating a beamforming weighting vector based on accurate information about the interference of a communication channel, the beamformed antenna pattern can effectively suppress interference in a wireless communications network through null-steering beamforming with multiple antennas.

The method disclosed herein is termed collaborated uplink sounding. Multiple BTSs select the same region in the frame as an uplink sounding region where all CPEs in a cell send uplink sounding signals to the BTS in the cell, which is in close collaboration with its neighboring BTSs in terms of selecting an uplink sounding region and sounding signals. As a result, the BTS can easily distinguish the desired signals from the interference signals.

For example, in a wireless communications network with a frequency re-use pattern of 1, uplink sounding assignment requires that all BTSs participating in collaborated uplink sounding select the same region in the uplink frame for transmitting uplink sounding signals. In other words, the uplink sounding region is the same for all BTSs. In order for multiple CPEs to share the same sounding region, the sounding signals of each CPE must be orthogonal to each other. Each of the BTSs participating in collaborated uplink sounding not only observes the signal of the CPEs in its cell but also the signals of the CPEs from its neighboring cells that might interfere with its uplink and downlink signals.

The sounding region can be viewed as a two-dimensional space of frequency and time. One multiple access technique is to devise a set of signal sequences that are used as sounding signals. All sounding signals occupy the same two-dimensional space and they are orthogonal to each other in the time or frequency domain. Each CPE uses a distinct signal sequence from the set of sounding signal sequences. This approach is commonly referred to as code division multiple access.

Another multiple access technique is to divide the two-dimensional sounding region into multiple non-overlapping sub-regions, each of which is assigned exclusively to a CPE. The approach is commonly referred to as time division multiple access or frequency division multiple access, depending on how the two-dimensional sounding region is divided. A BTS selects its uplink sounding signals in close collaboration with the other BTSs participating in collaborated uplink sounding.

Figure 1A:
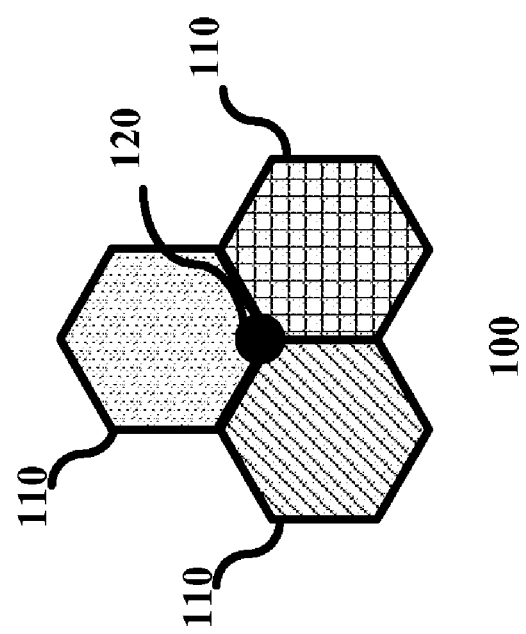
FIG. 1A illustrates a sounding signal re-use pattern with a cluster of three BTSs.
Figure 1B:
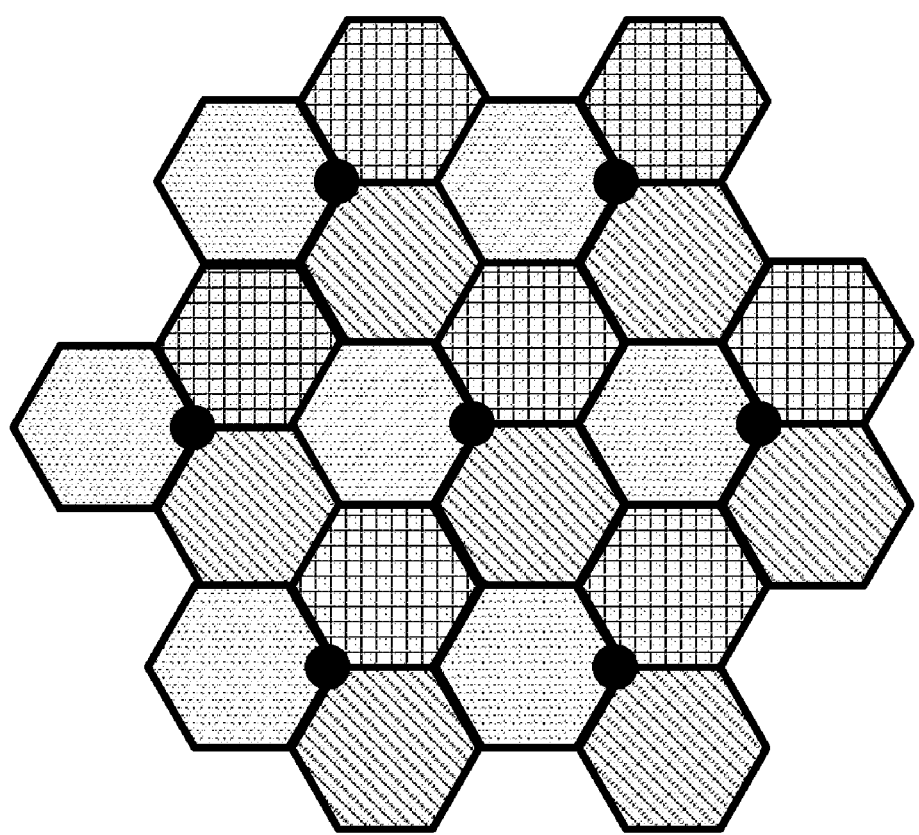
FIG. 1B illustrates a sounding signal re-use pattern with a plurality of clusters of three BTSs.

FIG. 1A illustrates a sounding signal re-use pattern with one cluster of three BTSs. A hexagon 110 represents a cell in a wireless communications network. A dot 120 in the vertex of three adjacent cells represents a site. The three BTSs adjacent to a site use different uplink sounding signals that are part of a set of orthogonal signals. The pattern of the three-BTS cluster is repeated in the entire network. FIG. 1B illustrates a sounding signal re-use pattern with a plurality of clusters of three BTSs. Sounding signal cluster patterns other than the three-BTS cluster pattern are also possible. One can plan a sounding signal pattern in a similar way as the frequency re-use pattern.

Figure 2:
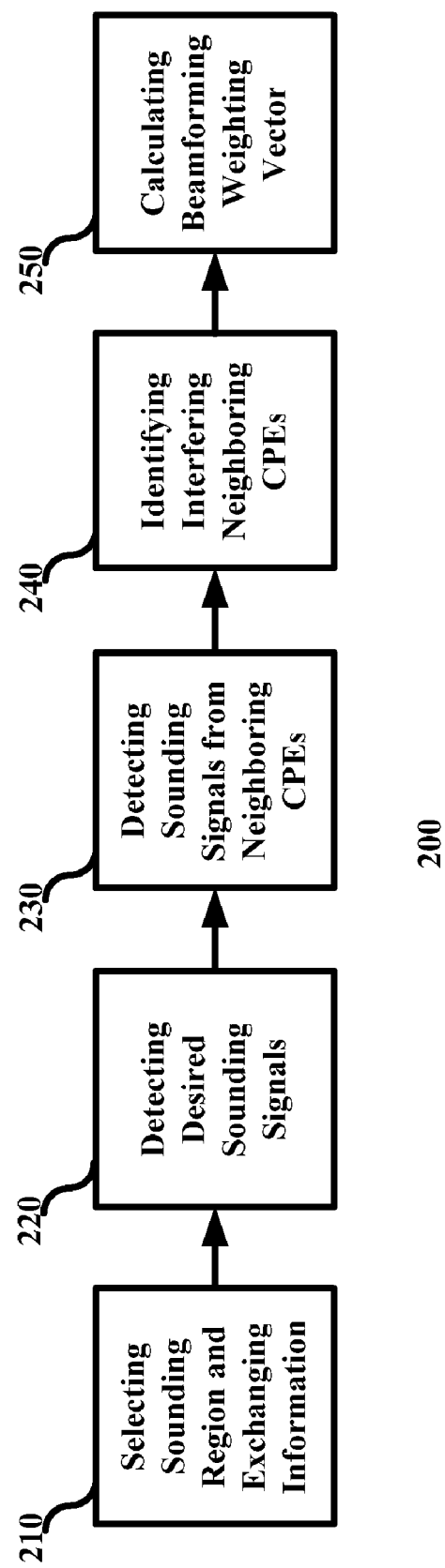
FIG. 2 is a flow diagram illustrating a collaborated uplink sounding method according to an embodiment.

FIG. 2 is a flow diagram illustrating a collaborated uplink sounding method according to an embodiment of the present invention.

In step 210, the BTS in a cell selects a region for an uplink channel, and the region is used as the designated sounding region. The BTS sends collaborated uplink sounding information to its neighboring BTSs. The rest of the BTSs participating in collaborated uplink sounding also undergo the same process. In other words, each BTS receives collaborated uplink sounding information from its neighboring BTSs.

The exchange of the collaborated uplink sounding information, including the uplink sounding region, resource allocation, and the sounding signal selection among the BTSs, occurs via the wire-line communications network. One way to exchange information is that all BTSs send messages regarding the information to a central control unit, which subsequently broadcasts the received information to the rest of the BTSs in the network. Another way is that each BTS sends the information directly to the rest of the BTSs. The network connection does not require a specific type of physical medium. Nor does it require a specific network protocol for exchanging messages.

The information about resource allocation of a BTS may change from time to time. A BTS may choose to send its resource allocation message to its neighboring BTSs constantly or send a resource allocation message only when there is a change in resource allocation information. All BTSs work in collaboration with one another based on the most updated information they receive.

In step 220, the BTS sends a CPE sounding signal allocation message containing information about how to send sounding signals. The CPE then sends uplink sounding signals in the designated uplink sounding region, which are later detected by the BTS. Using the uplink sounding signals, the BTS calculates the spatial signature, which is subsequently used to calculate a beamforming weighting vector.

In step 230, the BTS detects the sounding signals transmitted by the CPEs in the neighboring cells. Based on the collaborated uplink sounding information, the BTS knows from which neighboring CPE a sounding signal is sent and what resources are allocated to each neighboring CPE. The collaborated uplink sounding information comprises the designated uplink sounding region, channel allocation, and the signal sequence.

In step 240, the BTS determines whether the CPE in the cell and some of its neighboring CPEs share a channel, which is defined by frequency and time. If indeed channel-sharing occurs, the BTS determines whether the sounding signals corresponding to the neighboring CPEs are detected. If the signal level of the sounding signals from the neighboring CPEs exceeds a predetermined threshold, the spatial signature of the sounding signals is calculated and used as the interference spatial signature in the calculation of a beamforming weighting vector for a null-steering beamforming system. If, however, no channel-sharing occurs, the beamforming weight vector is calculated based on the spatial signature of the desired signal only.

The predetermined threshold could be set with the thermal noise floor taken into consideration. If the signal level of the sounding signals is higher than the predetermined threshold, the sounding signals are considered to be detectable, or else they are deemed as background noise. The predetermined threshold also determines whether the neighboring CPEs are potential interferers or interferees.

In step 250, the BTS computes uplink beamforming weighting vectors for the CPE by obtaining the primary eigenvector corresponding to the largest eigenvalue of the eigenvalue problem.

The same procedure also applies to the calculation of a downlink beamforming weighting vector. The sounding signals are transmitted in the downlink sounding region at a frequency that is as close to the frequency for sending data traffic as possible, if not the same, in order to reduce the loss of accuracy due to the frequency mismatch. All BTSs participating in collaborated downlink sounding select the same designated downlink sounding region in the frame.

It is possible that the uplink and downlink sounding regions are merged into one, if the downlink and uplink traffic is close in frequency and time. In this case, either the uplink or the downlink spatial signature can be used to calculate both uplink and downlink beamforming weighting vectors.

Figure 3A:
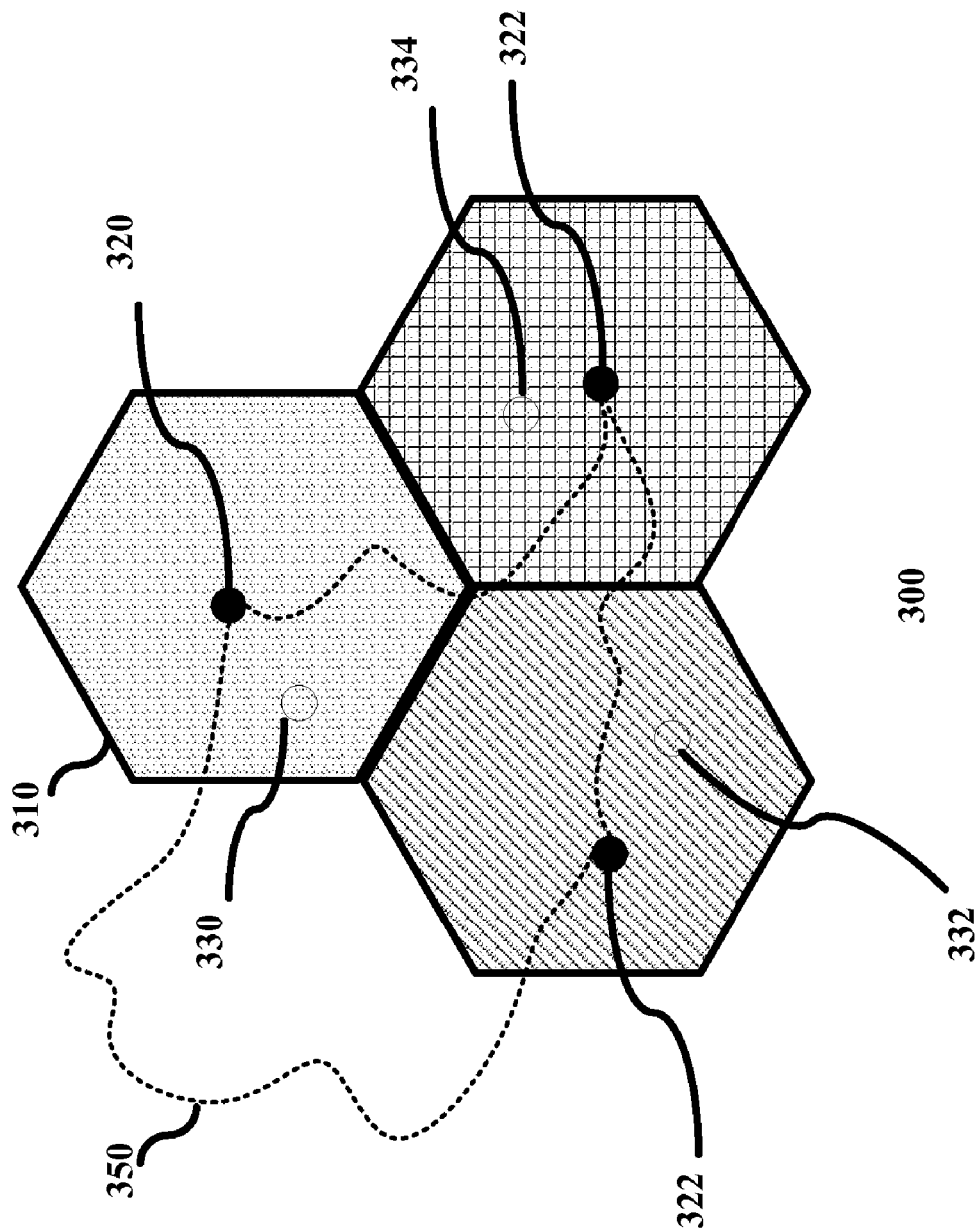
FIGS. 3A and 3B are diagrams that illustrate a collaborated uplink sounding system.
Figure 3B:
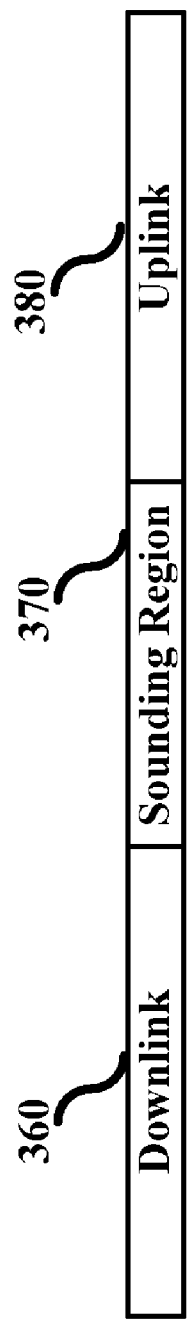

FIGS. 3A and 3B are diagrams that illustrate a collaborated uplink sounding system. FIG. 3A shows a cell 310, represented by a hexagon, in which there is a BTS 320, represented by a solid dot. BTSs 322, represented by solid dots, are in the neighboring cells of the cell 310. A CPE 330, represented by a circle, is served by the BTS 320 while CPEs 332 are in the neighboring cells. A wiggle line 350 connecting three BTSs represents a wired-line communications network. FIG. 3B shows a downlink frame 360, an uplink frame 380, and a sounding region 370.

A BTS receives uplink sounding signals in the sounding region 370. The uplink sounding signals from CPE 330 are desired signals while those from CPEs 332 are interference signals. The BTSs exchange collaborated uplink sounding information via the wired-line communication network 350.

The above illustration provides many different embodiments. Specific embodiments of components and processes are described to help clarify the subject matter disclosed herein. These are, of course, merely embodiments and are not intended to be limiting.

What is claimed is:

1. A method comprising:
designating a region in a transmission frame as an uplink sounding signal region that is to contain uplink sounding signal sequences to be transmitted by one or more customer premises equipment (CPE) in a cell intended for reception by a base transceiver station (BTS) in the cell;
at the BTS, communicating uplink sounding information including a selected sounding signal sequence used in the cell with at least one other BTS that serves CPEs in an adjacent cell, wherein the selected sounding signal sequence is selected from a set of orthogonal signal sequences such that a different sounding signal sequence is used in corresponding ones of a plurality of cells which are adjacent to each other to enable the BTS to distinguish a sounding signal received from a CPE in the cell from a sounding signal received from a CPE in an adjacent cell;
at the BTS, receiving one or more first sounding signals in the uplink sounding region of a transmission frame from a first CPE in the cell, wherein the one or more first sounding signals are considered desired signals based on the sounding signal sequence contained in the one or more first sounding signals;
based on the one or more first sounding signals received at the BTS, determining whether the first CPE uses the same channel as that used by one or more second CPEs in in one or more adjacent cells;
at the BTS, detecting one or more second sounding signals from the one or more second CPEs at the BTS and determining that the one or more second sounding signals are interference signals based on the sounding signal sequences contained therein; and
at the BTS, calculating a beamforming weighting vector using the one or more first sounding signals and the one or more second sounding signals in order to suppress the one or more second sounding signals.

2. The method of claim 1, wherein communicating the uplink sounding information comprises communicating via a wire-line communications network.

3. The method of claim 1, wherein communicating the uplink sounding information comprises the BTS sending the information to a central control unit which broadcast the uplink sounding information received to all the BTSs.

4. The method of claim 1, wherein communicating the uplink sounding information comprises the BTS sending the information directly to other BTSs associated with adjacent cells.

5. The method of claim 1, wherein communicating comprises continuously communicating the uplink sounding information to other BTSs.

6. The method of claim 1, wherein communicating comprises communicating the uplink sounding information which comprises information describing the uplink sounding region of the transmission frame, resource allocation for the cell, and the selected sounding signal sequence for the cell.

7. The method of claim 6, wherein the resource allocation includes channel allocation.

8. The method of claim 1, wherein determining that the one or more second CPEs use the same channel as the first CPE comprises using the uplink sounding information from BTSs in adjacent cells to identify the one or more second CPEs that use the same channel as the first CPE.

9. The method of claim 1, wherein the channel is defined by frequency and time.

10. The method of claim 1, wherein detecting the one or more second sounding signals comprises ignoring the one or more second sounding signals when their signal level is below a predetermined threshold such that the one or more second sounding signals are not determined to be interference signals.

11. The method of claim 10, and further comprising setting the predetermined threshold based on a thermal noise floor.

12. The method of claim 1, wherein calculating the beamforming weighting vector comprises:
calculating a first spatial signature associated with the desired signals using the one or more first sounding signals;
when the first CPE and the one or more second CPEs are determined to use the same channel, calculating a second spatial signature associated with the interference signals using the one or more second sounding signals; and
calculating the beamforming weighting vector using the first and the second spatial signatures.

13. A method comprising:
designating a region in a transmission frame as an uplink sounding signal region that is to contain uplink sounding signal sequences to be transmitted by one or more customer premises equipment (CPE) in a cell intended for reception by a base transceiver station (BTS) in the cell;
at the BTS, communicating continuously via a wire-line communications network with at least one other BTS that serves CPEs in an adjacent cell, wherein the uplink sounding information comprising the uplink sounding region, resource allocation, and a selected sounding signal sequence, wherein the selected sounding signal sequence is selected from a set of orthogonal signal sequences such that a different sounding signal sequence is used in corresponding ones of a plurality of cells which are adjacent to each other to enable the BTS to distinguish a sounding signal received from a CPE in the cell from a sounding signal received from a CPE in an adjacent cell;
at the BTS, receiving one or more first sounding signals in the uplink sounding region of a transmission frame from a first CPE, wherein the one or more first sounding signals are considered desired signals based on the sounding signal sequence contained in the one or more first sounding signals;

based on the one or more first sounding signals received at the BTS, determining whether the first CPE uses the same channel as that used by one or more second CPEs in in one or more adjacent cells;

at the BTS, detecting one or more second sounding signals from the one or more second CPEs at the BTS and determining that the one or more second sounding signals are interference signals based on the sounding signal sequences contained therein; and at the BTS, calculating a beamforming weighting vector using the one or more first sounding signals and the one or more second sounding signals in order to suppress the one or more second sounding signals.

14. The method of claim 13, wherein communicating continuously the uplink sounding information comprises the BTS sending the information to a central control unit which broadcasts the uplink sounding information received to all BTSs.

15. The method of claim 13, wherein communicating continuously the uplink sounding information comprises the BTS sending the information directly to other BTSs associated with the adjacent cells.

16. The method of claim 13, wherein the resource allocation includes channel allocation.

17. The method of claim 13, wherein the channel is defined by frequency and time.

18. The method of claim 13, wherein detecting the one or more second sounding signals comprises ignoring the one or more second sounding signals when their signal level is below a predetermined threshold such that the one or more second sounding signals are not determined to be interference signals.

19. The method of claim 18, and further comprising setting the predetermined threshold based on a thermal noise floor.

20. The method of claim 13, wherein calculating the beamforming weighting vector comprises:

calculating a first spatial signature associated with the desired signals using the one or more first sounding signals;

when the first CPE and the one or more second CPEs are determined to use the same channel, calculating a second spatial signature associated with the interference signals using the one or more second sounding signals; and calculating the beamforming weighting vector using the first and the second spatial signatures.

21. A system comprising:

a plurality of base transceiver stations (BTSs) that are configured to wirelessly communicate in a corresponding one of a plurality of adjacent cells, such that each BTS is assigned to a different one of the plurality of cells;

a plurality of customer premises equipment (CPE) that are configured to wirelessly communicate with a BTS in one of the plurality of cells;

wherein each BTS is configured to:

communicate with other BTSs uplink sounding information associated with other cells, the uplink sounding information including selected signal sequences used for uplink sounding by all CPEs in its corresponding cell such that a different one of a plurality of orthogonal signal sequences is used for uplink sounding in corresponding ones of the adjacent cells;

distinguish an uplink sounding signal received from any CPE in its cell from an uplink sounding signal received from any CPE in an adjacent cell based on the sounding signal sequence contained in the received uplink sounding signal;

receive one or more first sounding signals in the uplink sounding region of a transmission frame transmitted by a first CPE in its cell;

detect one or more second sounding signals from one or more second CPEs in one or more of the adjacent cells;

determine that the one or more second sounding signals are interference signals based on the sounding signal sequences contained therein; and compute a beamforming weight vector using the one or more first sounding signals and the one or more second sounding signals in order to suppress the one or more second sounding signals when communicating with the first CPE.

22. The system of claim 21, wherein each BTS is further configured to compute the beamforming weight vector when it is determined that the one or more first sounding signals and the one or more second sounding signals are in the same channel.

23. The system of claim 21, wherein each BTS is configured to communicate the uplink sounding information comprising information describing the uplink sounding region of the transmission frame, resource allocation for its cell and the selected signal sequence for uplink sounding in its cell.

24. The system of claim 21, wherein each BTS is configured to compute the beamforming weighting vector by:

computing a first spatial signature associated with the one or more first sounding signals;

when the first CPE and the one or more second CPEs are determined to use the same channel, computing a second spatial signature associated with the one or more second sounding signals; and computing the beamforming weighting vector using the first and the second spatial signatures.

* * * * *